United States Patent [19]

Kindermann et al.

[11] 3,955,868
[45] May 11, 1976

[54] CONNECTOR FOR TELEPHONE MAIN DISTRIBUTING FRAME

[75] Inventors: Wilfred Julius Kindermann, Chatham; Lawrence Miles Slavin, Rockaway; Robert Alvin Soltis, Succasunna; Ambrose James Vallely, Florham Park, all of N.J.

[73] Assignee: Bell Telephone Laboratories, Incorporated, Murray Hill, N.J.

[22] Filed: July 18, 1974

[21] Appl. No.: 489,579

[52] U.S. Cl. ................................ 339/18 B; 339/36; 339/150 T; 220/331
[51] Int. Cl.² .................... H01R 25/06; H01R 13/44
[58] Field of Search ............ 339/18 R, 18 B, 18 C, 339/19, 150 T, 151 M, 222, 276 A, 36, 37

[56] References Cited
UNITED STATES PATENTS

| | | | |
|---|---|---|---|
| 1,135,426 | 4/1915 | Bauman | 220/331 |
| 2,879,493 | 3/1959 | Bender | 339/18 B |
| 3,027,534 | 3/1962 | Deakin | 339/18 C |
| 3,088,087 | 4/1963 | Colten | 339/18 R |
| 3,149,899 | 9/1964 | Johanson | 339/276 A |
| 3,217,284 | 11/1965 | Shlesinger | 339/18 B |
| 3,291,925 | 12/1966 | Hartsock | 339/18 R |
| 3,300,750 | 1/1967 | Harner et al. | 339/18 B |
| 3,518,611 | 6/1970 | Shores | 339/18 R |
| 3,611,268 | 10/1971 | Webb | 339/151 M |
| 3,731,261 | 5/1973 | Spadoni | 339/276 A |
| 3,760,328 | 9/1973 | Georgopulos | 339/18 R |

*Primary Examiner*—Roy Lake
*Assistant Examiner*—Craig R. Feinberg
*Attorney, Agent, or Firm*—A. D. Hooper; C. E. Graves

[57] ABSTRACT

A connector for a main distributing frame comprises two spaced apart panels with the first panel having pluggable electrical protector sockets and test points mounted therein flush with the outside face. The test points and the outside plant ones of the protector sockets have pin terminals extending therefrom into the space between the two panels. The central office ones of the protector sockets have pin terminals extending therefrom through the second panel to present wire wrappable ends at the outside of the second panel. Connections of outside plant conductors to the test point terminals and connections from these terminals to the protector sockets are protected in the space between the panels. If desired, the test point terminals can be prewired to cable-connectors mounted on the first panel which are adapted to receive mating connectorized outside plant stub cables. A slideable cover mounts over the wire wrappable ends at the outside of the second panel to provide protection thereto. The connector mounts in bookcase fashion within the main frame.

1 Claim, 4 Drawing Figures

CONNECTOR FOR TELEPHONE MAIN DISTRIBUTING FRAME

BACKGROUND OF THE INVENTION

1. Field of the Invention

This invention relates to terminal apparatus for telephone central office main distributing frames.

2. Description of the Prior Art

Connectors used with main distributing frames are the electrical interface between feeder cables from the exchange area or outside plant and the central office switching equipment. These connectors typically consist of an elongated panel with facilities for mounting up to 100 protector assemblies. The latter provide each incoming telephone line where necessary with voltage and sneak current protection for the associated central office equipment and also serve as switches to connect and disconnect each line individually. Each connector also includes test points and a field of terminals for crossconnecting the office side of each protector with equipment terminals on the horizontal side of the main frame via so-called jumper wires.

Most presently known connectors comprise a relatively wide flat panel which mounts on the main distributing frame with the major surfaces of the panel generally parallel with the front of the main frame. The connector mounting arrangement limits the termination density which can be obtained. This limitation on termination density is becoming increasingly important. Another disadvantage of some existing connectors is their relative high susceptibility to damage during activities on the main frame.

Accordingly, it is a broad object of this invention to improve connectors for use on main distributing frames.

Another object is to increase the termination density of such connectors.

Still another object is to improve the resistance of such connectors to damage resulting from activities on the main frame.

SUMMARY OF THE INVENTION

The foregoing objects and others are achieved in accordance with this invention by a connector for main distributing frame applications which comprise two spaced apart panels with the first panel having pluggable electrical protector sockets or terminals and test points or terminals mounted therein flush with the outside face. The test points and the outside plant ones of the protector sockets have pin terminals extending therefrom into the space between the two panels. The central office ones of the protector sockets have pin terminals extending therefrom through the second panel to present wire wrappable ends at the outside of the second panel. Connections of outside plant conductors to the test point terminals and connections from these terminals to the protector sockets are protected in the space between the panels. If desired, the test point terminals can be prewired to cable-connectors mounted at the outside of the first panel which are adapted to receive mating connectorized outside plant stub cables. A slideable cover mounts over the wire wrappable ends at the outside of the second panel to provide protection thereto. The connector mounts in bookcase fashion within the main frame. This connector provides a termination density approximately twice as great as that provided by many commonly used connectors.

BRIEF DESCRIPTION OF THE DRAWING

The invention will be more fully comprehended from the following detailed description and accompanying drawing in which.

DETAILED DESCRIPTION

Figure 1:
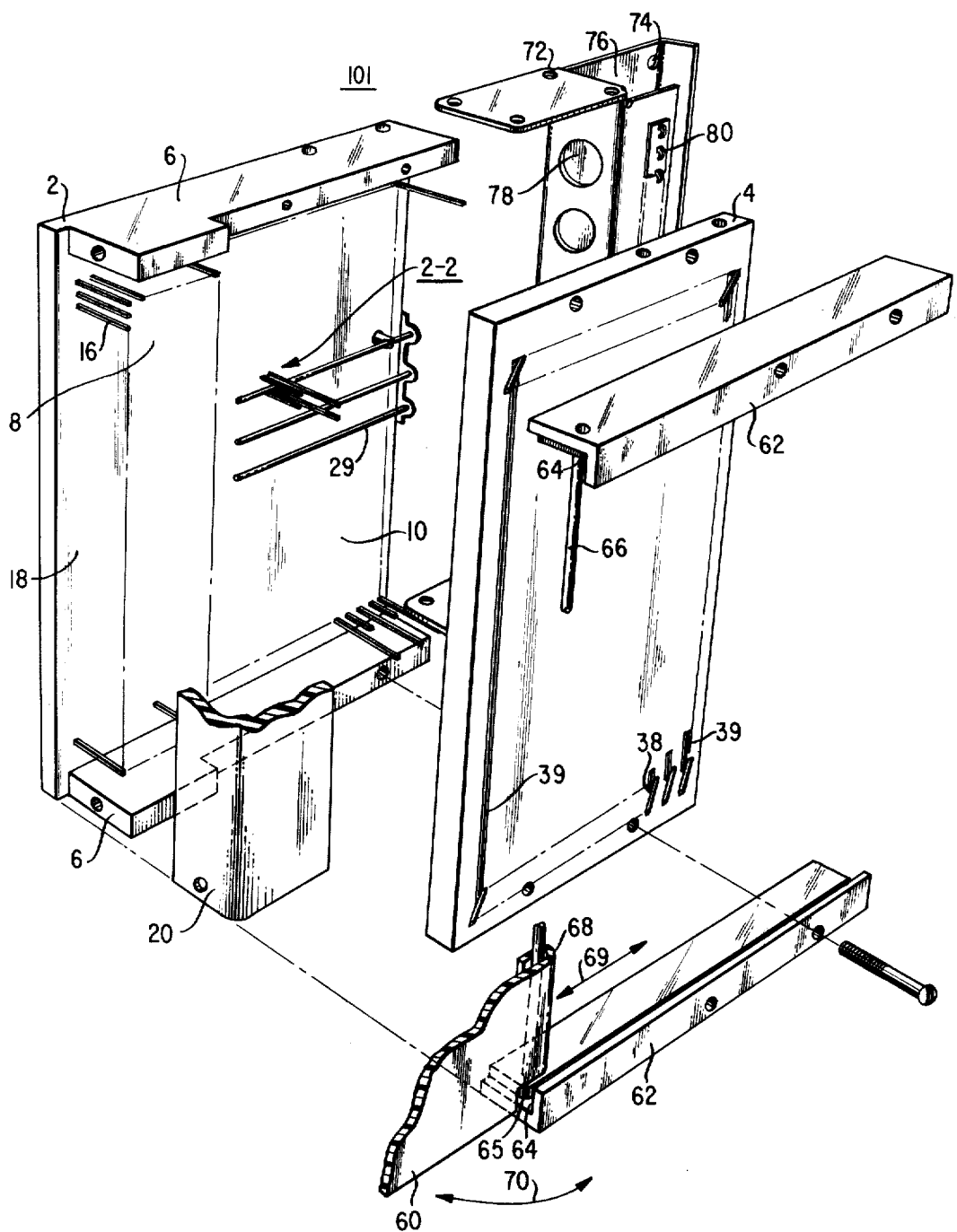
FIG. 1 is an exploded perspective view of the connector of this invention as viewed from the top right.

As shown in FIG. 1, the connector 101 of this invention includes left and right or first and second panels 2 and 4, respectively, mounted and held in spaced apart, substantially parallel relationship to each other by suitable spacers 6 which may be formed as integral parts of one panel such as panel 2, and standard hardware such as screws. Panels 2 and 4 can be formed of a suitable heat and fire resistant, durable, insulative material such as a polycarbonate material commercially available under the name Lexan.

Figure 2:
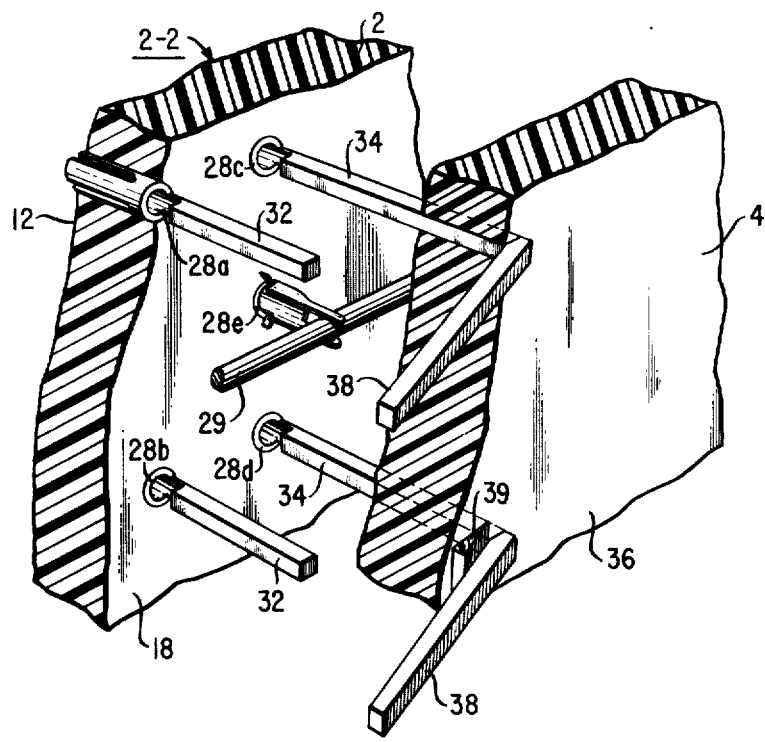
FIG. 2 is an enlarged perspective view of the portion 2—2 of FIG. 1.

Left panel 2 includes two sets or fields 8 and 10 of terminals such as test points or pin-grip sockets mounted therein with one end flush with or slightly below the outer face or surface 12 of panel 2 as shown more clearly in FIGS. 2-4.

Terminals 14 of field 8 comprise test points or terminals to which connections can be made for performing the standard circuit tests well known in the art. Terminals 14 include an end portion or terminal 16 extending from the inner face 18 of panel 2 for providing a wire wrap terminal for purposes to be discussed subsequently. Right panel 4 advantageously is terminated short of terminal field 8 so that ends 16 of terminals 14 are not covered thereby. Rather a separate narrow L-shaped panel or cover 20 is removably mounted over ends 16 by mounting to brackets 6 by appropriate hardware. Cover 20 covers both the rear and side of ends 16.

Terminals 22 of field 10 comprise female sockets or receptacles adapted to receive plug-in protector units 24 therein. Suitable protector units are well known in the art. Terminals 22 are divided or grouped into groups 26 of five terminals arranged to match the mating pins 27 on the protector units 24 to be plugged therein. For example, terminals 28a, 28b, 28c, 28d, and 28e in a particular group 26 respectively comprise the outside plant side of tip and ring, the switching equipment side of tip and ring and ground. Terminals 28a, 28b and 28e have respective ends or terminal portions 32 extending from the outside surface 18 into the space 30 between panels 2 and 4. Terminals 28c and 28d have pin terminals or portions 34 extending from surface 18 through space 30, through panel 4 and from the outer surface 36 of panel 4. The ends 38 of these pin terminals which extend from surface 36 are angled forward toward the front 40 of connector 101. These ends 38 present readily accessible wire wrap terminals to which cross-connections can be made. A ridge or spacer 39 of insulative material which can comprise an integral part of panel 4 is formed along each column of terminal ends 38 to serve as a stop for wire-wrapping tools engaging ends 38. Ground terminals 28e are interconnected and connected to ground by appropriate conductors 29.

Figure 3:
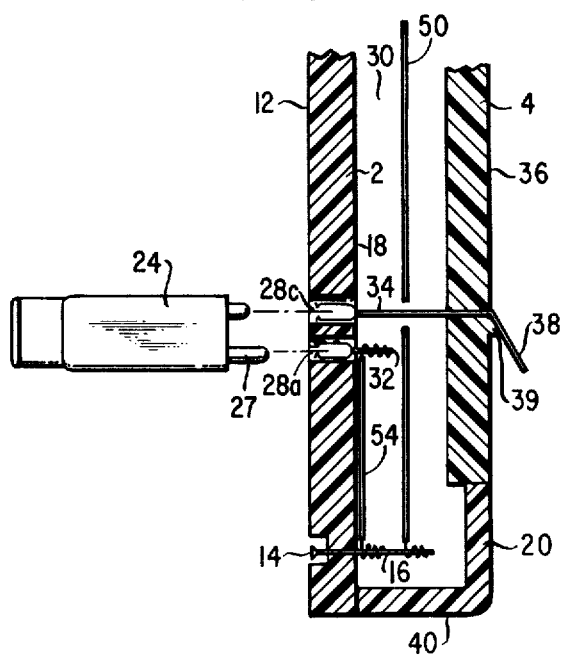
FIG. 3 is a schematic representation of a horizontal section through the connector looking downward.

FIG. 3 is a schematic representation of a horizontal section through connector 101 looking downward and illustrating the wiring thereof. Only one conductor is illustrated in this representation. However, it should be kept in mind that the same basic wiring schemes applies to all tip and ring conductors. An outside plant conductor 50 is fed between panels 2 and 4 and is connected by wire wrapping or the like to the end 16 of a test field terminal 14. Conductor 50 can comprise a conductor in a stub cable which is spliced to an outside plant cable at an appropriate location in the wire center. Alternatively, conductor 50 can be connected to a plug-in cable-connector such as cable-connectors 52 in FIG. 4 which are mounted directly on connector 101. Mating connectorized outside plant stub cables can then be plugged into cable connectors 52.

A short conductor 54 connects end 16 of test terminal 14 to the end 32 of an outside plant terminal 28a (or 28b). An inside plant or central office terminal 28c (or 28d) is located beside terminal 28a (or 28b). A protector unit 24 can then be plugged into terminals 28a and 28c (and, 28b and 28d) as indicated to interconnect these terminals and provide the proper voltage and current protection therebetween for the particular tip (or ring) conductor. Cross-connections to switching equipment and the like can then be made to the end 38 of pin 34 which extends from terminal 28c (or 28d) through space 30 and panel 4 to be accessible for wire wrapping or the like at the outside of panel 4.

The connections between conductor 50 and the end 16 of terminal 14 and between conductor 54 and the ends 16 and 32 can be made in the factory. Thereafter these connections are enclosed and protected between panels 2 and 4 and removable cover or panel 20. Thus there is little danger of damage to these connections during subsequent activities on the main frame. In the event that a connection of conductor 50 must be repaired, cover 20 can be removed to provide access to the end 16 of terminal 14 where such repair can be made without disturbing the connection of conductor 54 to the ends 32 and 16 of terminals 28a and 14.

Terminals 14, and 28a–28e are flush with or recessed slightly below the outer surface 12 of panel 2. Thus there is little likelihood of damage to these terminals from bending, et cetera as encountered in some present connectors having pin terminals extending outward from the faces of the connectors. Also, there is little likelihood of personal exposure to high voltages due to contact with the outside plant side terminals 28a and 28b in case of excessive voltages appearing on the outside plant cable when protector units have been, or are in the process of being, pulled out or removed from the panel in the event of power crosses or other unexpected failures. Unlike existing connectors when access to the cross-connect pins is not needed, the ends 38 are protected by a cover 60 which can be moved aside to provide access when required, as shown in FIG. 1. In the event that an end 38 of a pin 34 is damaged or broken from bending, et cetera, it can be readily replaced without disturbance to other circuits on the connector. This is accomplished by removing or straightening the angled end 38 and pushing pin 34, including terminal 28c (or 28d), out through the outer face 12 of panel 2. A new terminal 28c (or 28d), including straight portions 34 and end 38 is then fully inserted into face 12 of panel 2 until end 38 extends from outer face 36. The end 38 is then bent forward to form the proper angle.

A pair of brackets 62 are mounted to the outer surface 36 of panel 4 by suitable hardware. Each bracket 62 includes a slot or channel 64 therein having a rounded corner 65. A post or stop 66 is disposed between the two brackets 62 at the front end. Cover 60 is slideably mounted in channels 64. Cover 60 includes a lip 68 on one end which extends inward toward ends 38 and which has a reduced height as compared with the remainder of cover 60. When access to ends 38 is required, cover 60 is slid toward the front 40 of connector 101 as indicated by arrow 69. Prior to removal of cover 60 from channels 64, lip 68 engages post or stop 66 to prevent complete removal of cover 60 and to provide a pivot for rotating cover 60 around corner 65 as indicated by arrow 70 to prevent it from interfering with access to ends 38. Cover 60 can comprise a suitable plastic material having characteristics such as fire and heat resistance, et cetera as previously mentioned.

Along its rear edge, connector 101 includes a combination mounting bracket and wiring channel 72. Bracket 72 includes holes 74 by which it can be mounted to the main frame. Conductors from outside plant stub cables enter trough or channel 76 in bracket 72 and are fed through fanning holes 78 to access test terminals 14 as previously explained with reference to FIG. 3. Bracket 72 includes a fanning strip 80 along the rear surface for receiving the cross-connect wires from ends 38.

As mentioned earlier, connector 101 is mounted in bookcase fashion on a main frame, i.e., on edge with the major surfaces thereof substantially perpendicular to the front of the frame. With this mounting, access is available to both sides of the connectors. Thus protector units 24 can be easily installed in appropriate groups 26 of terminals 28a–28e as discussed and testing can be performed by using the readily accessible test terminals 14 which are located along the front edge on one side of the connector. Cross-connections to switching equipment are made to ends 38 of terminals 34 on the equally accessible other side of connector 101. The orientation of ends 38 toward the front 40 of connector 101 facilitates the making of wire wrap connections and the like to these terminals. The bookcase mounting of connector 101 so that respective sides can be utilized for mounting protector units and testing and for cross-connections essentially doubles the attainable termination density of connector 101 as compared with commonly used connectors without sacrificing accessibility. The construction of the connector also provides substantial physical protection for all terminal on wire interconnections on the connector.

Figure 4:
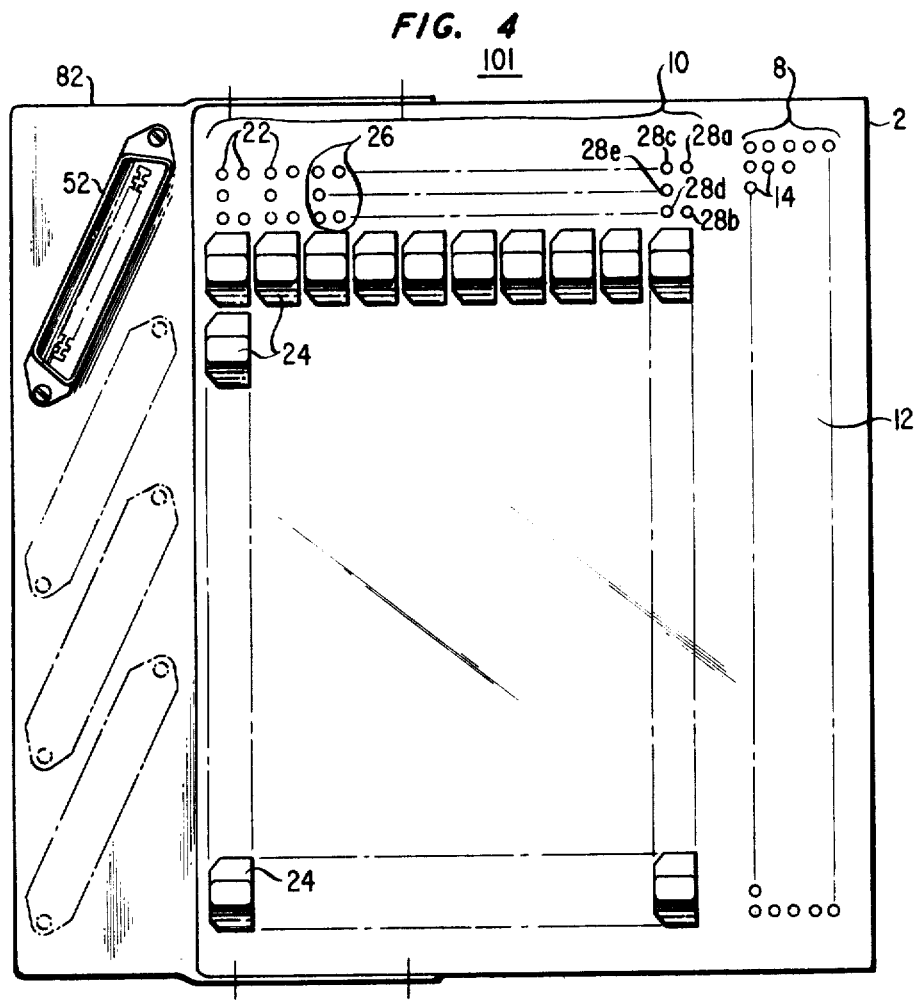
FIG. 4 is a left-hand elevational view of a second embodiment of the connector including the aforementioned prewired cable connectors.

As briefly indicated earlier, bracket 72 can be replaced by a connectorized version 82 as shown in FIG. 4. In this embodiment, the wires from terminals 14 go through fanning holes 78 and are then terminated in cable-connectors 52. Outside plant stub cables having mating connectorized ends can then be plugged into cableconnectors 52 as desired.

While the invention has been described with reference to a specific embodiment, it is to be understood that various modifications thereto might be made without departing from the spirit and scope of the following claims.

What is claimed is:

1. A connector for a telephone main distributing frame comprising in combination:
   first and second substantially rectangular panels each having first and second sides and mounted in spaced relation to each other to define a space between said first sides;
   a first array of female pin-grip terminals mounted in a first section of said first panel and adapted to receive pluggable electrical protector modules therein, a first group of said terminals having first ends extending from said first side of said first panel into said space to be accessible for making connections thereto within said space, a second group of said terminals having first ends extending from said first side of said first panel through said space and said second panel to be accessible for making connections thereto on said second side of said second panel;
   a second array of test terminals mounted in a second section of said first panel and having first ends extending from said first side of said first panel whereby connections to said test terminals and said first group of pin-grip terminals can be made within said space and protected therein by said panels;
   first and second brackets mounted on said second side of said second panel, each of said brackets including a channel therein,
   a rod member disposed between respective opposing ends of said brackets, and
   a cover slideably mounted in said channels, said cover including a lip member for engaging said rod to provide a stop and pivot for said cover when said cover is moved to provide access to said first ends of said second group of terminals.

* * * * *